F. H. Manny,
Mower.

No. 38,970 — Patented June. 23, 1863

UNITED STATES PATENT OFFICE.

FREDERICK H. MANNY, OF ROCKFORD, ILLINOIS.

IMPROVEMENT IN HARVESTERS.

Specification forming part of Letters Patent No. 38,970, dated June 23, 1863.

*To all whom it may concern:*

Be it known that I, FREDERICK H. MANNY, of Rockford, in the county of Winnebago and State of Illinois, have invented a new and improved machine capable of being used as a harvester for cutting grain, or as mower for cutting grass, of which the following is a full and exact description, reference being had to the accompanying drawings, which make part of this specification, and in which—

Figure 1:
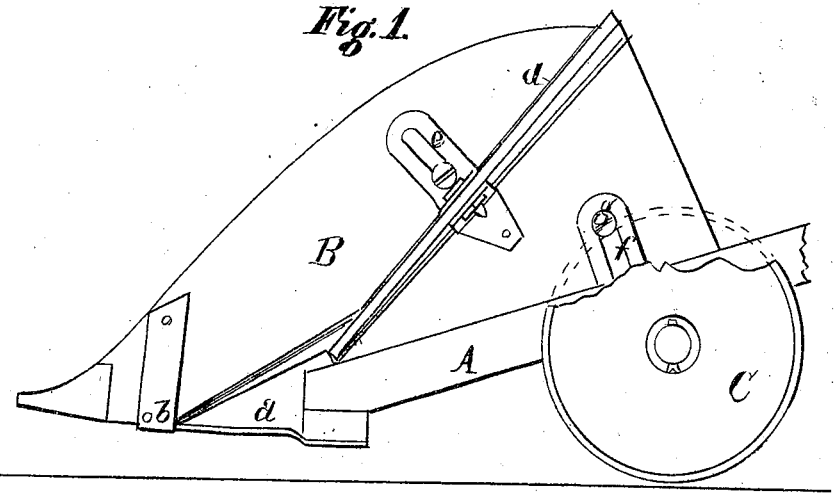
Figure 2:
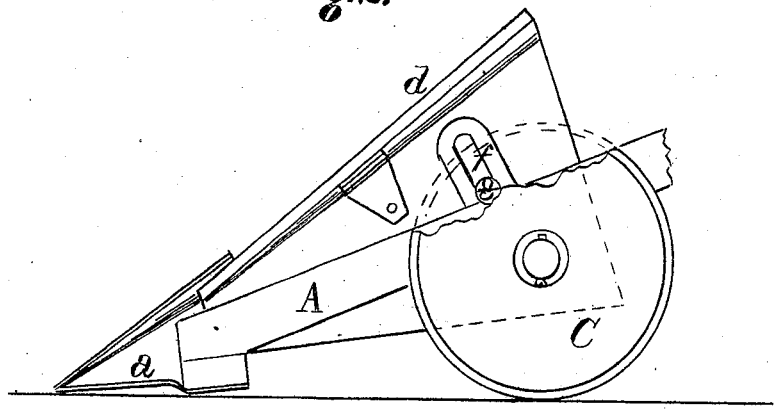

Figure 1 represents a view in elevation of the divider or grain side of a harvesing-machine to which my improvements are applied, the finger-beam being elevated and shield-board being raised, and the supplementary divider attached, as in cutting tall and heavy grain; and Fig. 2, a similar view of the same with the finger-beam touching the ground and the shield-board lowered to act as a track-clearer, as in mowing.

In each of the figures a portion of the grain-wheel is shown as broken away in order to show the device for adjusting the shield-board.

The tendency of modern improvements in the reaper and mower has been to shorten the frame to render the machine as light as was consistent with the strength absolutely required and as portable as possible consistently with the necessary space for properly manipulating the grain. Experince has demonstrated, also, that in this class of machines it is of much importance to place the axis of the driving and grain wheels as near as practicable to the finger-beam.

In all harvesters which have a frame-work running out from the gear-frame in rear of the cutting apparatus to support the grain-wheel and the outer end of the finger-beam it has ever been found difficult to adapt them usefully to mowing, because the rear of the short frame became so much elevated as, when the grass was heavy, to cause it to lodge and clog upon the divider or shield-board, and this so continuously as to render it frequently necessary to place an extra hand upon the raker's stand to clear the accumulating grass.

It is also obvious that the nearer the axis of the driving and grain wheels are to the finger-beam the more marked this difficulty will become. Besides all this, when the frame is tilted on the axles, placed near the finger-beam, it necessarily raises the outer side piece of the frame so far above the ground that when mowing the shield-board will pass above the grass and will not act as a track scraper or clearer.

In reaping it is necessary that the wing-board should be elevated high enough to turn all the heads of the tallest grain inward upon the platform and also to enable it perfectly to divide the grain. Now, to drop the finger-beam upon the ground, as it must be in mowing, the wing-board presents an angle to the ground so acute as to drag the grass and absolutely prevent the wing-board from clearing itself.

It is the object of my invention to obviate all these difficulties, and the importance of my improvements will be obvious when it is manifest that they permit the axis of the driving and grain wheels to be brought near the finger-beam without rendering the machine cumbrous, and permit the use of the short frame without disturbing the track-clearer, and provide an effective divider for the reaper that is no obstruction to the mower.

My invention consists in hinging or pivoting the shield-board to the hem or pawl of the divider and giving it a vertical adjustability that permits it to be raised to turn the heads of the grain inward upon the platform when the machine is used as a harvester, and lowered when used as a mover to bring the track-clearer into effective action; and my invention further consists in combining with the hinged or pivoted adjustable shield-board a supplementary divider to enable the machine to be used as a harvester.

From the outer side piece, A, of the frame of the harvester, at the end near the finger-beam, projects a hem or pawl, *a*, to the rear end of which the shield-board B is hinged or pivoted at *b*. This shield-board is made in a triangular form, and its base projects rearward a proper distance beyond the axle of the grain-wheel C to turn all the heads of grain over which the machine passes upon the platform. A flanged guide or separator, *d*, on the upper edge of the shield serves to give it strength, prevent it from warping, and as a support to the adjusting slotted bracket *e*, which keeps it in its proper relation to and serves to sustain the supplementary divider B in its vertical position. A bracket, *f*, attached to the beam A, and having a curved slot to secure the set-screw *g*, which fastens into the shield-board, enables the shield-board to be adjusted at any elevation most suitable to the height of the standing grain, or, when used as a mower, to be depressed low enough to render its lower edge an effective track-clearer. The inclination of the shield-board to the frame can also be adjusted and secured by the position of this slotted bracket $f$, which may be made adjustable horizontally, if desired. The lower end of the supplementary divider B, as the harvester terminates in a shoe, the heel of which is made with a recess that fits on the hem or pawl $a$ of the reaper, and the form of its dividing-edge is in such a curve as while dividing the grain it neatly cleans itself. This divider, it will be readily understood, is always removed when the harvester is changed to a mower.

In operating as a harvester, the divider is attached by its shoe to the hem and secured in place by the bracket in the flange of the shield and a set-screw which passes through the slot of the bracket and is fastened into the the divider, while the shield-board is raised a proper distance at its rear end and secured in place by its bracket and set-screw when the machine is ready to be started. When used for mowing the supplementary divider is removed and the shield-board is depressed so as to be sufficiently near to the ground to act as a track-clearer and fastened in place by the set-screw, as before.

It is obvious that other modes of adjustment for the parts requiring adjustment may be used without affecting the principles of my invention.

What I claim as my invention, and desire to secure by Letters Patent of the United States, is—

1. The shield-board, constituting both a separator and track-clearer, substantially as herein described, for the purposes set forth.

2. The combination of an adjustable shield-board, which acts both as a separator and track-clearer, with a supplementary divider, substantially in the manner and for the purposes described.

In testimony whereof I have hereunto subscribed my name.

FREDERICK H. MANNY.

Witnesses:
JAMES L. LINDERMAN,
J. G. MANLOVE,